United States Patent [19]
Pyo

[11] Patent Number: 5,939,854
[45] Date of Patent: *Aug. 17, 1999

[54] CIRCUIT FOR DRIVING A SWITCHED RELUCTANCE MOTOR

[75] Inventor: Sang-Yeon Pyo, Yongin, Rep. of Korea

[73] Assignee: Samsung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/812,594

[22] Filed: Mar. 7, 1997

[30] Foreign Application Priority Data

May 31, 1996 [KR] Rep. of Korea ............ 96-19439

[51] Int. Cl.⁶ .................................................. H02P 7/36
[52] U.S. Cl. ............................................ 318/701; 318/254
[58] Field of Search ................................. 318/701, 254, 318/439, 138

[56] References Cited

U.S. PATENT DOCUMENTS

| | | | |
|---|---|---|---|
| 3,728,598 | 4/1973 | May | 318/696 |
| 4,240,040 | 12/1980 | Saari | 330/255 |
| 4,490,661 | 12/1984 | Brown et al. | 318/461 |
| 4,933,621 | 6/1990 | MacMinn et al. | 318/696 |
| 4,943,760 | 7/1990 | Byrne et al. | 318/701 |
| 5,124,591 | 6/1992 | Chan et al. | 307/494 |
| 5,166,591 | 11/1992 | Stephens et al. | 318/701 |
| 5,225,758 | 7/1993 | Sakano et al. | 318/701 |
| 5,581,171 | 12/1996 | Kerfoot et al. | 320/50 |
| 5,610,486 | 3/1997 | Li | 318/439 |
| 5,614,797 | 3/1997 | Carobolante | 318/432 |
| 5,627,444 | 5/1997 | Fulks | 318/701 |
| 5,656,897 | 8/1997 | Carobolante et al. | 318/254 |
| 5,666,035 | 9/1997 | Basire et al. | 318/254 |

*Primary Examiner*—Jonathan Salata
*Attorney, Agent, or Firm*—Burns, Doane, Swecker & Mathis, L.L.P.

[57] ABSTRACT

A switch reluctance motor drive circuit includes first drive circuits (50) for driving a plurality of high switching elements (23, 24, 25), in response to an input signal ($H_{in}$) for driving a gate of the high switching element, and second drive circuits (52) for driving a low switching elements (26, 27, 28), in response to an input signal ($L_{in}$) for driving the gates of the low switching element. A single DC voltage source is commonly applied to the first drive circuits, and the first drive circuits each have a transistor (T1) connected between a gate (G) of the switching element (e.g., 23) and the DC voltage source to turn on the switching element (23) corresponding thereto, and a second transistor (T2) connected between the gate (G) and source (S) of the switching element (23) to turn off the switching element (23). A single DC voltage source is commonly applied to second drive circuits, and the second drive circuits each have a third transistor (T3) connected between the gate (G) of the switching element (26) and the DC voltage source to turn on the switching element (e.g., 26) corresponding thereto, and a fourth transistor (T4) connected between the gate (G) and source (S) of the switching element (26) to turn off the switching element (26).

5 Claims, 4 Drawing Sheets

CIRCUIT FOR DRIVING A SWITCHED RELUCTANCE MOTOR

BACKGROUND OF THE INVENTION

1. Field of the Invention

The present invention relates to a circuit for driving an invertor-type SRM(Switched Reluctance Motor) and, more particularly to SRM drive circuit configured such that only a single DC voltage source can be used in applying each of gate control signals for driving first and second switches of the invertor to each gate of the switching elements, for simplifying the construction of the drive circuit and reducing manufacturing costs.

2. Description of the Prior Art

Generally, a DC voltage source is required to drive switching elements constituting an invertor in SRM drive circuit. More specifically, 3-phases switched reluctance motor requires 3 DC voltage sources for driving 3 first(or upper) switching elements, respectively, and one DC voltage source for driving another 3 second(or lower) switching elements.

FIG. 1 shows a conventional SRM drive circuit diagram, and FIG. 2 shows a schematic construction of the conventional SRM. As shown in FIG. 1, the circuit is formed of A-, B-, and C-phase coils 100 to 102, and a first to sixth elements(substantially Field Effect Transistor FET elements) 103 to 108 for sequentially applying DC voltage $V_{DC}$ to the A-, B-, and C- phase coils 100 to 102, respectively, wherein the elements 103 and 106, 104 and 107, and 105 and 108 are coupled to both ends of the respective coils 100, 101, 102 in series, respectively. Capacitor 99, which serves to charge the residual component in the A-, B-, and C-phase coils 100 to 102 when the first to sixth FET elements 103 to 108 are turned off, is coupled in parallel with the circuitry including the above-mentioned circuit elements of FETs 103 to 108 and coils 100 to 102.

Also, first to sixth diodes 111 to 116, each being used to pass the residual component in the A-, B-, and C-phase coils 100, 101, 102, when the first to sixth FET elements 103 to 108 are turned off, towards the capacitor 99, are coupled in parallel with the first to sixth FET elements 103 to 108, respectively.

And, the A-phase coil 100 comprises the windings on the stator poles +A and −A; the B-phase coil 101 comprises the windings on the stator poles +B and −B; and the C-phase coil 102 comprises the windings on the stator poles +C and −C.

For the purpose of explaining, the circuit operation associated with A-phase will be discussed. With the first and fourth FET elements 103, 106 commonly turned on, a DC voltage $V_{DC}$ is applied to A-phase coil 100. Thus, poles +A and −A of the stator 120 on which A-phase coil is wound are magnetized. The magnetization of the stator poles +A and −A produces a force which attracts the pole of the rotor 121, which thus allows the rotor 121 to be rotated.

In such a manner, if the voltage $V_{DC}$ is sequentially applied to A-phase coil 100, B-phase coil 101, and then C-phase coil 102 through the control of the first to sixth FET elements 103 to 108 in the above-mentioned order, the continuous rotation of the rotor 121 can be maintained.

Meanwhile, when the first to sixth FET elements 103 to 108 which has applied the DC voltage $V_{DC}$ to each of phase coils 100 to 102 become turned off, the residual back e.m.fs at each phase coils 100 to 102 are fed to capacitor 99 through each diodes 111 to 116.

However, since ground points for the first FET elements 103, 104, 105 are different from those for the second FET elements 106, 107, 108, the voltages V1, V2, V3 for driving bases of the first FET elements 103, 104, 105 have to be not identical to the voltage V4 for driving bases of the second FET elements 106, 107, 108.

This requires 3 separate DC voltage sources for supplying voltages V1, V2, V3 for driving the first FET elements 103, 104, 105, and another one DC voltage source for supplying voltage V4 for driving the second FET elements 106, 107, 108, which causes the circuitry to be complicated, and it increases in costs for manufacturing desired circuitry.

SUMMARY OF THE INVENTION

Therefore, it is an object of the present invention to provide a switched reluctance motor drive circuit configured such that only a single DC voltage source can be used in applying each of gate control signals for driving first and second switches of the invertor to each gate of the switching elements, for simplifying the construction of the circuit and reducing manufacturing costs.

The above objects are accomplished by a switched reluctance motor drive circuit comprising:

a plurality of first switching element drive circuits which apply a DC voltage to each gate of the first switching elements and switch the first switching elements, the DC voltage being used in driving the switching elements and being supplied from a single DC voltage source at the time of an application of the gate drive signals for the first switching elements; and a plurality of second switching element drive circuits which apply said DC voltage to each gate of the first switching elements and switch the first switching elements, the DC voltage being used in driving the second switching elements and being supplied from said single DC voltage source at the time of an application of the gate drive signals for the second switching elements.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

The preferred embodiment according to the present invention will now be described in detail in accordance with the accompanying drawings.

Figure 1:
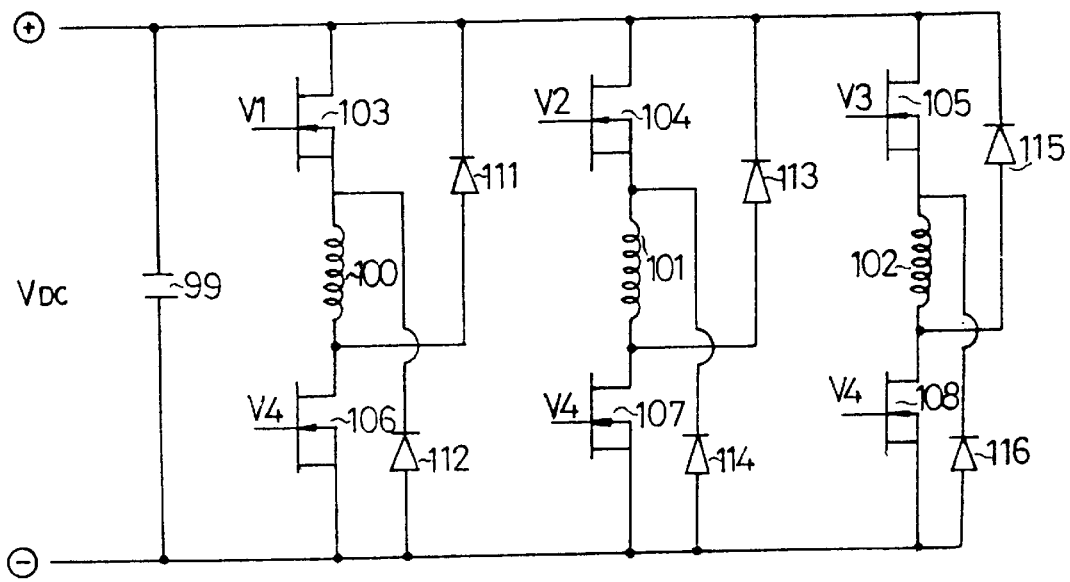
FIG. 1 is a conventional switched reluctance motor SRM drive circuit diagram.
Figure 2:
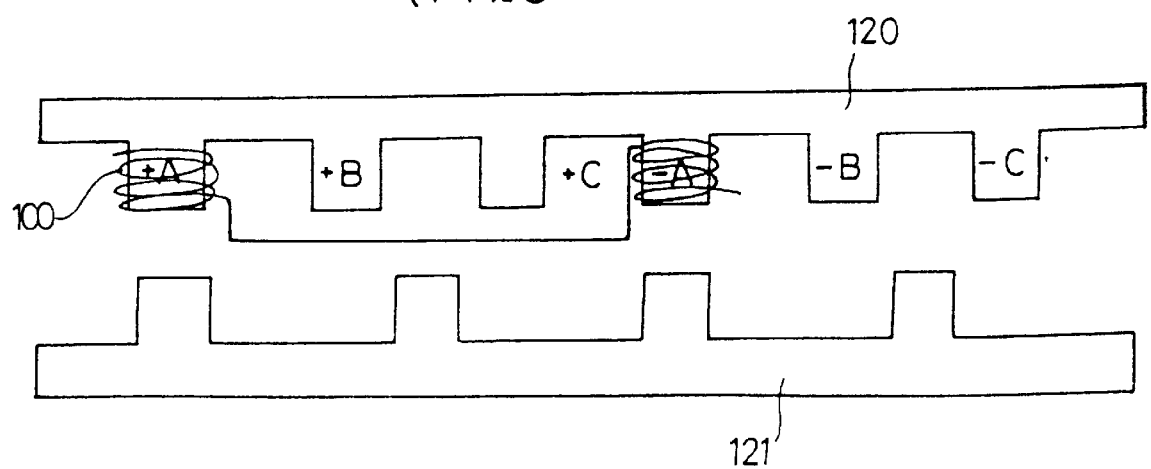
FIG. 2 shows a schematic construction of a conventional SRM.
Figure 3:
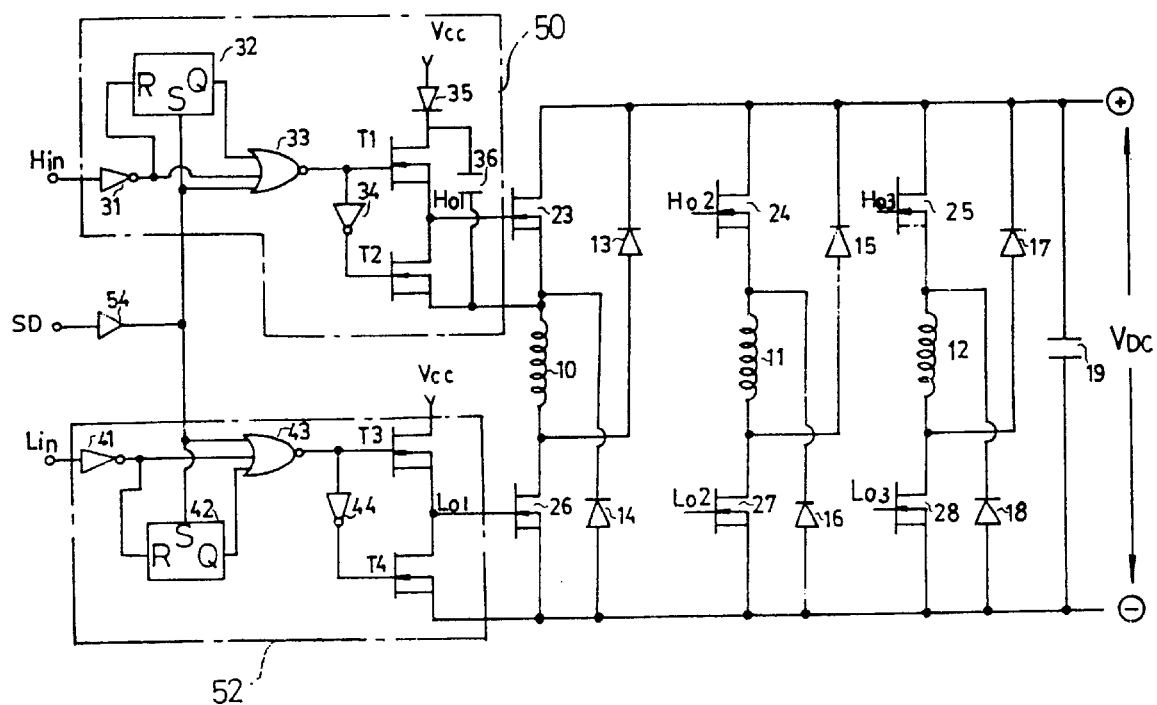
FIG. 3 is a detailed circuit for driving SRM in accordance with the present invention.

FIG. 3 is a detailed circuit for driving a SRM in accordance with the present invention. The drawing shows only the circuit configuration for driving switching elements associated with A-phase, but it is noted that although not shown in the drawing, B-and C-phase related circuits have the same structures as the circuit disclosed for A-phase.

As shown in FIG. 3, to both ends of A-phase coil 10 wound on any stator poles of the motor are in serial coupled A-phase related FET elements 23, 26, respectively, for applying or blocking a DC voltage $V_{DC}$ to the above A-phase coil 10. In such a manner, B- and C-phase coils are also coupled to the relevant FET elements 24, 27 and 25, 28, like A-phase coil 10.

Also, first to sixth diodes 13 to 18, each being used to pass the back e.m.fs generated at each of A-, B-, and C-phase coils 10, 11, 12, when the first to sixth FET elements 23 to 28 are turned off, towards the capacitor 19, are coupled in parallel with the first to sixth FET elements 23 to 28, respectively.

A circuit for driving the above A-phase switching elements 23, 26 is formed of circuits 50 and 52 for driving first and second A-phase related switching elements, wherein the circuit 50 is operated to apply to gate of the first switching element 23, a DC voltage Vcc for driving the first switching element 23 which is supplied from a DC voltage source in case of the presence of a gate drive signal Hin so as to drive the first switching element 23, and wherein the circuit 52 is operated to apply to gate of the second switching element 26, a DC voltage Vcc for driving the second switching element 26 which is supplied from a DC voltage source in case of the presence of a gate drive signal Lin so as to drive the second switching element 26.

Although not shown in FIG. 3, drive circuits for B- and C-phase switching elements act like the drive circuit for A-phase switching elements, wherein those circuits for B- and C-phase also receive a DC voltage Vcc for driving switching elements from the DC voltage source which is used in A-phase related switching elements drive circuit as mentioned above.

The present circuit uses a shut down signal SD for stopping operations of the switching circuits. This signal is input to the respective switching circuits to block the supply of the DC voltage Vcc for driving switching elements which is fed to the gates of the switching elements 23 to 28, such that all the switching elements 23 to 28 are turned off. SD signal is input to the respective circuits 50 and 52 through a buffer 54, as shown in drawing, which is substantially employed in consideration of lots of load which any means provided for producing SD signal becomes responsible for, in case said means is directly coupled to a plurality of circuits for driving switching components.

The first A-phase related switching elements drive circuits 50 includes a first invertor 31 which outputs an inverted gate drive signal Hin, a first RS flip-flop 32 having R input terminal which receives signal output from the first invertor 31, S input terminal which receives SD signal from the buffer 54, and Q output terminal which outputs a latched R input signal in response to SD signal, a first NOR gate 33 which receives 3 signals output from the first RS flip-flop 32, the first invertor 31 and the buffer 54 and output negation of logical summation, a first transistor T1 for supplying the DC voltage Vcc to gate of the switching element 23 and turning on the switching element 23, a second invertor 34 which outputs receives the signal from the first NOR gate 33 and outputs an inverted signal thereof, a second transistor T2 responsive to the output signal from the second invertor 34, for connecting the gate of the element 23 to ground to turn off the first A-phase switching element 34, and the diode and capacitor elements 35, 36 provided for preventing switching operation of the element 34 from being delayed as compared with switching operations of the switching elements T1, T2.

Duration of the state transition from 'Off' to 'On' of the first transistor T1 can be shortened with the voltage of the capacitor 36.

The second A-phase related switching elements drive circuits 52 includes a third invertor 41 which outputs an inverted gate drive signal Lin, a second RS flip-flop 42 having R input terminal which receives signal output from the third invertor 41, S input terminal which receives SD signal output from the buffer 54, and Q output terminal which outputs a latched R input signal in response to SD signal, a second NOR gate 43 which receives 3 signals output from the second RS flip-flop 42, the third invertor 41 and the buffer 54 and output negation of logical summation, a third transistor T3 for supplying the DC voltage Vcc to gate of the switching element 26 and turning on the element 26, a fourth invertor 44 which receives the signal from the second NOR gate 43 and outputs an inverted signal thereof, and a fourth transistor T4 responsive to the output signal from the fourth invertor 44, for connecting the gate of the element 26 to ground to turn off the second A-phase switching element 26.

When the gate drive signal Hin of high level for turning on the first A-phase switching element 23 is input, the input signal is inverted by the first invertor 31 to produce low level signal, and this signal of low level is latched at the first RS flip-flop 32 and applied to the first NOR gate 33.

At this time, since all the signals input to the first NOR gate 33 have low levels, the first NOR gate 33 outputs high level signal.

Accordingly, high level signal from the first NOR gate 33 turns on the first transistor T1, which allows the DC voltage Vcc to be supplied to the first A-phase switching element 23 so that this element 23 can be turned on.

Also, the above high level signal from the first NOR gate 33 is inverted by the second invertor 34, thus the second transistor T2 is turned off.

When the gate drive signal Hin of low level for turning off the first A-phase switching element 23 is input, the input signal is inverted by the first invertor 31 to produce high level signal, and this signal of high level is latched at the first RS flip-flop 32 and applied to the first NOR gate 33.

At this time, since the first NOR gate 33 outputs low level signal, this signal turns off the first transistor T1. Low level signal from the first NOR gate 33 is also inverted by the second invertor 34, thus the second transistor T2 is turned on.

When the gate drive signal Lin of high level for turning on the second A-phase switching element 26 is input, this input signal is inverted by the third invertor 41 to produce low level signal, and this signal of low level is latched at the second RS flip-flop 42 and applied to the second NOR gate 43.

At this time, since all the signals input to the second NOR gate 43 have low levels, the second NOR gate 43 outputs high level signal.

Accordingly, high level signal from the first NOR gate 43 turns on the third transistor T3, which allows the DC voltage Vcc to be supplied to the second A-phase switching element 26 so that this element 26 can be turned on.

The above high level signal from the second NOR gate 43 is also inverted by the fourth invertor 44, thus the fourth transistor T4 is turned off.

When the gate drive signal Lin of low level for turning off the second A-phase switching element 26 is input, this input signal is inverted by the third invertor 41 to produce high level signal, and this signal of high level is latched at the second RS flip-flop 42 and applied to the second NOR gate 43.

At this time, since the second NOR gate 43 outputs low level signal, this signal turns off the third transistor T3. Low level signal from the second NOR gate 43 is also inverted by the fourth invertor 44, thus the fourth transistor T4 is turned on.

At this time, when SD signal of high level is input through the buffer 54, this signal disables both first and second RS flip-flops 32, 42, so that these flip-flops 32, 42 output only low level signal regardless of any input signals thereto. This causes the first and third transistors T1, T3 and the second and fourth transistors T2, T4 to be turned on and off, respectively, thus both first and second A-phase switching elements 23, 26 become turned off.

It is noted that the above-mentioned switching elements can be implemented such as MOSFET, IGBT, transistor, etc.

While only a circuit for driving A-phase switching elements as specific embodiments of the present invention have been described in this specification, this description is merely illustrative of the principle of present invention, and the constructions of B- and C-phase related drive circuits are also identical to A-phase related drive circuit. B- and C-phase related drive circuits also utilize the DC voltage Vcc for driving the switching element which is used in A-phase switching element drive circuit as the DC voltage source, and SD signal which is input through the buffer 54, but are only different from A-phase related drive circuit in that each of B- and C-phase related drive circuits uses, not gate drive signal for A-phase related drive circuit, each of signals for drive gate of switching element, each signal being separately available from control means(not shown).

Figure 4:
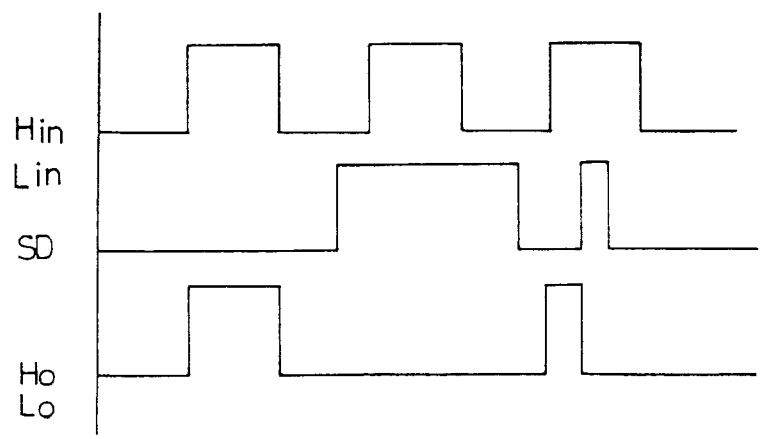
FIG. 4 illustrates waveforms of the input and output signals of SRM drive circuits according to the present invention.

FIG. 4 illustrates waveforms of the input and output signals of SRM drive circuits according to the present invention. It can be seen from the drawing that when SD is input during application of gate drive signals Hin or Lin, the power supply Ho or Lo is then blocked which is fed to gates of the switching elements from gate drive circuits for the first and second switching elements.

Figure 5A:
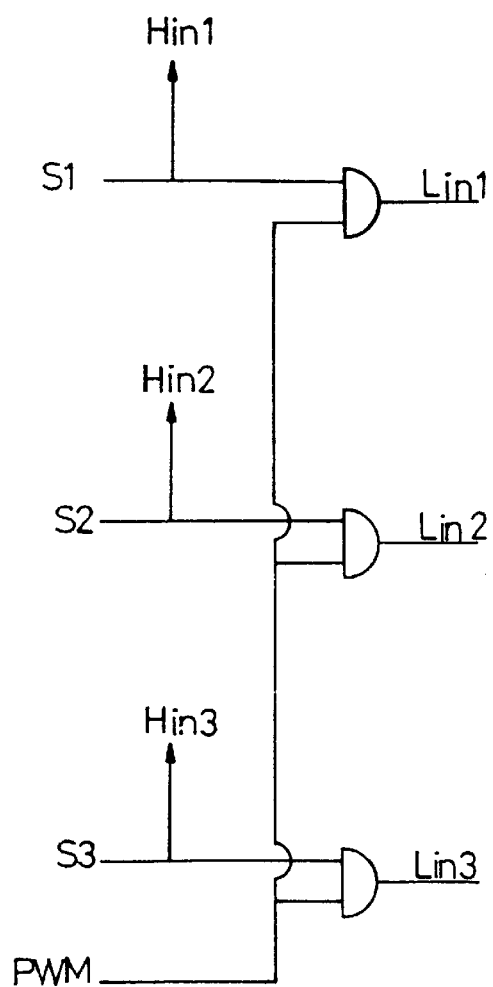
FIG. 5(A) illustrates logic diagram for formation of signal for the speed control of SRM according to the present invention.
Figure 5B:
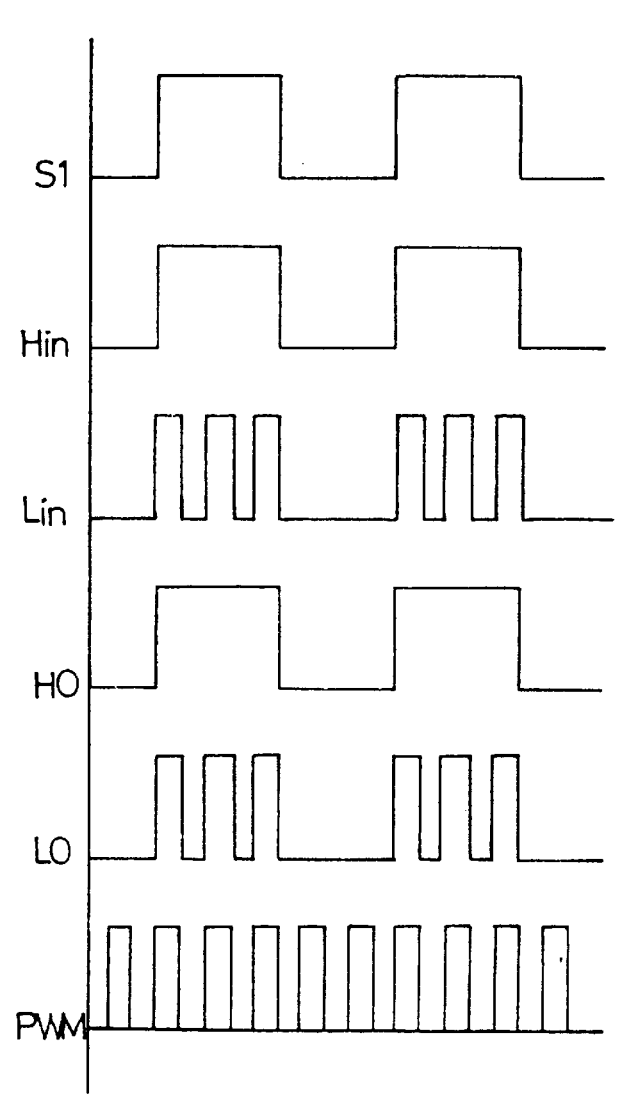
FIG. 5(B) illustrates waveforms of various signals in FIG. 5(A).

FIG. 5(A) illustrates logic diagram for the formation of signal for the speed control of SRM according to the present invention, and FIG. 5(B) illustrates waveforms of various signals in FIG. 5(A).

The signal for driving gate of the first switching element Hin is available from rotor position sensing means(not shown) as rotor position signal S, and the signal for driving the second switching element Lin is obtained from the logical product of the rotor position signal S and PWM signal.

Figure 6A:
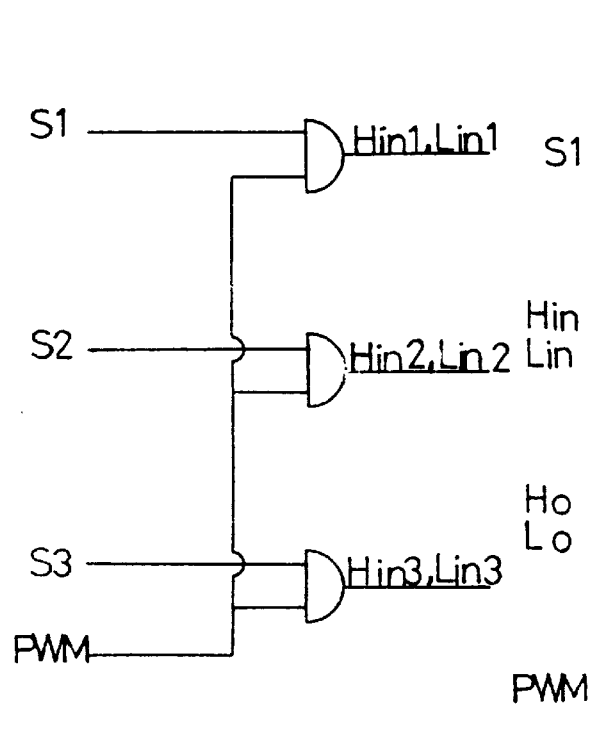
FIG. 6(A) illustrates logic diagram for formation of signal for the speed control of SRM according to the present invention.
Figure 6B:
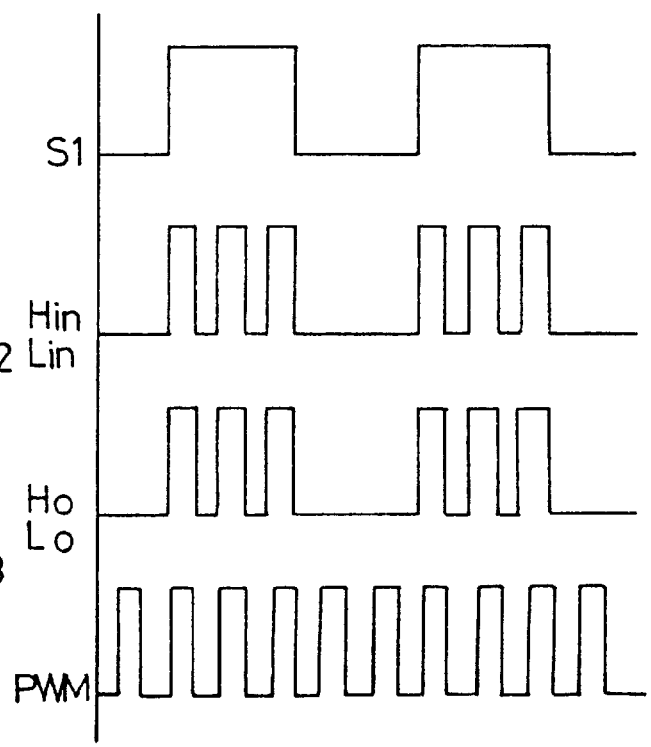
FIG. 6(B) illustrates waveforms of various signals in FIG. 6(A).

FIG. 6(A) illustrates logic diagram for the formation of signal for the speed control of SRM according to the present invention, and FIG. 6(B) illustrates waveforms of various signals in FIG. 6(A).

The signals for driving gate of the first and second switching elements Hin, Lin may be obtained from the logical product of the rotor position signal S and PWM signal.

The true scope and spirit of the present invention are defined in the accompanying claims, if necessary, together with reference numerals corresponding to claim elements which are placed for facilitating to understand the present invention, but not to be interpreted in a limiting sense.

Also, one skilled in the art will appreciate that various modifications are possible, without departing from the scope and spirit of the invention.

According to the foregoing disclosure, the present invention simplifies the construction of the circuit and thus reduces manufacturing costs therefor, for only a single DC voltage source can be used in applying signals for driving gates of the first and second switching elements.

What is claimed is:

1. A switched reluctance motor drive circuit comprising:
   a plurality of first drive circuits for driving a plurality of high switching elements, in response to an input signal for driving a gate of a first switching element, wherein each of the first drive circuits includes:
      a first invertor component which outputs an inverted gate drive signal for the first switching element,
      a first RS flip-flop which receives a signal output from the first invertor component and a shut down signal, and outputs the signal output from the first invertor component in response to the shut down signal,
      a first NOR gate which receives: output from the first RS flip-flop, the first invertor component, and the shut down signal; and outputs a negation of a logical summation of the input signals thereto,
      a first transistor responsive to the signal output from the first NOR gate, for supplying the DC voltage for driving a gate of the first switching element and turning on said switching element,
      a second invertor component which outputs the signal received from the first NOR gate and outputs an inverted signal thereof, so as to exclusively operate the first transistor and a second transistor;
   wherein a single DC voltage source is commonly applied to the plurality of first drive circuits, the plurality of first drive circuits, each having the first transistor connected between a gate of the switching element and the DC voltage source to turn on the switching element corresponding thereto, and the second transistor connected between the gate and source of the switching element to turn off the switching elements;
   a plurality of second drive circuits for driving a plurality of low switching elements, in response to an input signal for driving a gate of a second switching element, wherein each of the second drive circuits includes:
      a third invertor component which outputs an inverted gate drive signal for the second switching element,
      a second RS flip-flop which receives a signal output from the third invertor component and a shut down signal, and outputs a latched signal from the first invertor component in response to the shut down signal,
      a second NOR gate which receives: signals output from the second RS flip-flop, the third invertor component and shut down signals; and outputs a negation of a logical summation of the input signals thereto,
      a third transistor responsive to the signal output from the second NOR gate, for supplying the DC voltage for driving a gate of the second switching element and turning on said switching element, and
      a fourth invertor component which outputs the signal received from the second NOR gate and outputs an inverted signal thereof, so as to exclusively operate the third transistor and a fourth transistor,
   wherein a single DC voltage source is commonly applied to the plurality of second drive circuits, the plurality of second drive circuits each having the third transistor connected between a gate of a third switching element and the DC voltage source to turn on the switching element corresponding thereto, and the fourth transistor connected between the gate and source of the switching element to turn off the switching element; and a stabilizing circuit having diode and capacitor elements provided for preventing switching operation of the first and second transistors from being delayed as compared with switching operation of the first switching element.

2. The circuit as claimed in claim 1, wherein the circuit further comprises a buffer which applies SD the shut down signal to both RS flip-flops and NOR gates.

3. The circuit as defined in claim 1, wherein a gate drive signal for a first switching element comprises a rotor position signal which is input from rotor position sensing means, and wherein the drive signal for the second switching element comprises signal obtained from logical product of the rotor position signal and PWM signal.

4. The circuit as defined in claim 1, wherein the gate drive signal for the first and second switching elements comprise a signal obtained from a logical product of a rotor position signal from a rotor position sensing means and a PWM signal.

5. The circuit as claimed in claim 1, wherein the circuit further comprises a buffer which applies the shut down signal to both RS flip-flops and NOR gates.

\* \* \* \* \*